_Patented Nov. 14, 1950_  2,529,542

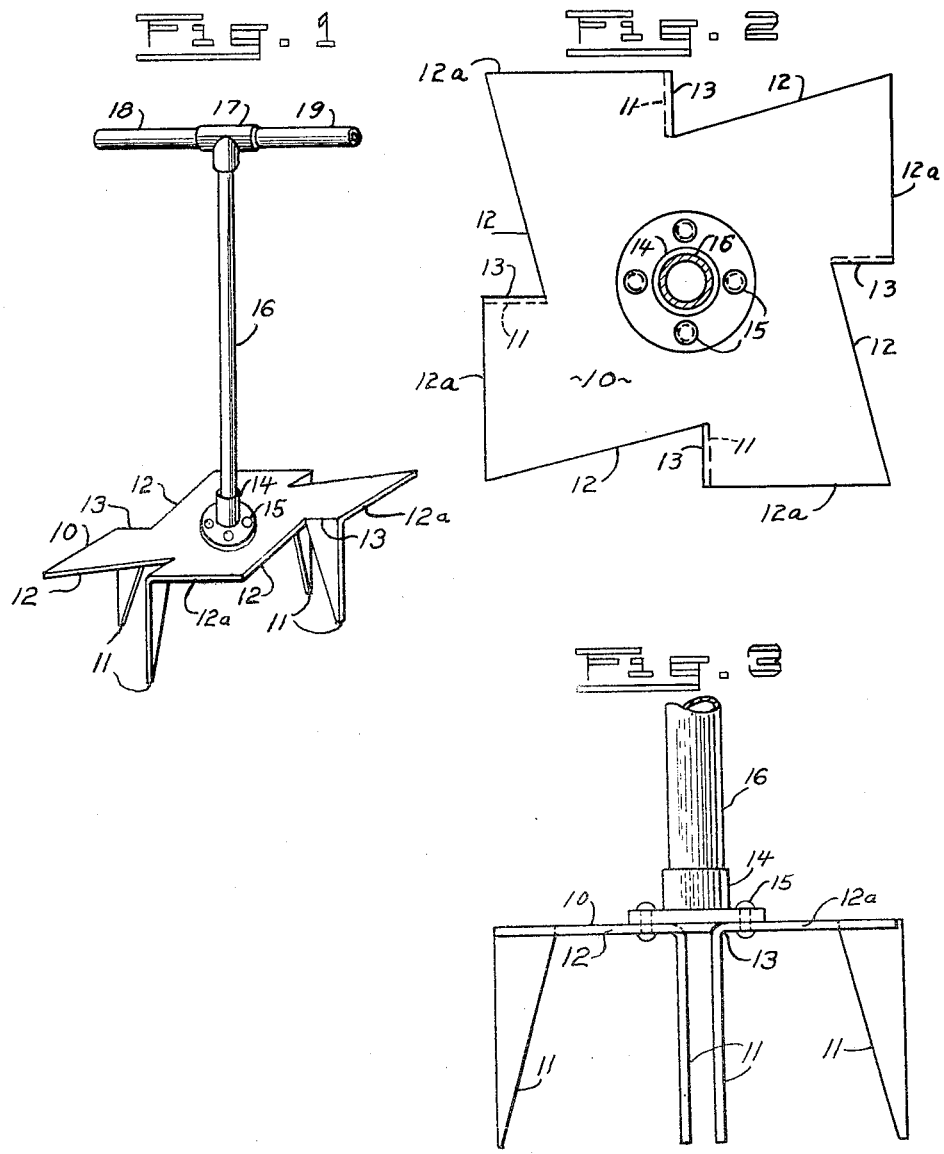

UNITED STATES PATENT OFFICE 2,529,542

HAND CULTIVATOR AND WEEDER

Peter De Conti, New Britain, Conn.

Application October 29, 1948, Serial No. 57,360

3 Claims. (Cl. 97—61)

This invention relates to garden tools, and more particularly to a hand cultivator and weeder, having a plurality of depending prongs and a vertical handle.

One object of this invention is to provide a device of the above nature having flat prongs which are so arranged as to break up the soil efficiently when the tool is manually rotated.

Another object is to provide a device of the above nature in which the base and prongs are economically formed integrally from a single piece of sheet metal.

A further object is to provide a device of the above nature which will be simple in construction, inexpensive to manufacture, easy to manipulate, compact, ornamental in appearance, and very efficient and durable in use.

With these and other objects in view, there has been illustrated on the accompanying drawing one form in which the invention may conveniently be embodied in practice.

In the drawing,

Fig. 1 is a perspective view of the improved cultivator and weeder.

Fig. 2 is a plan view of the same, the handle being shown in cross section.

Fig. 3 is a front view of the same, showing a portion of the handle.

Referring now to the drawing, in which like reference numerals denote corresponding parts throughout the several views, the numeral 10 indicates a substantially square base of flat sheet metal having four flat depending prongs 11. In making the cultivator, the sides of the base 10 are cut inwardly on an incline from each corner portion to points slightly past the centers of the respective sides of the square, thus forming inclined edges 12.

The metal outwardly of the inclined edges 12 is then bent downwardly at right angles to the base 10 in order to form the tapered prongs 11, the roots of which are joined to the base 10 at bends 13 disposed at right angles to outer edges 12a of the base 10. The tapered prongs 11 are slightly offset from radial planes, and may be described as being disposed in planes which are all tangent to the same circle at the center of the base 10.

The upper surface of the base 10 has a central pipe flange forming a tapped tubular socket 14 secured thereto by rivets 15. The socket 14 is adapted to be screwed to the lower end of a T-shaped vertical pipe handle 16.

The T-shaped handle 16 comprises an upper T 17 which preferably has a pair of opposite horizontal lengths of metal pipe 18, 19 secured in the sides thereof.

*Operation*

In operation, the handle sections 18, 19 will be grasped and twisted back and forth so as to agitate the tapered prongs 11 in the soil, thus breaking it up and uprooting weeds therein. During operation, the cultivator will, of course, be lifted and moved laterally from time to time by means of the handle 16 in order to cultivate the desired area of soil.

One advantage of the improved cultivator is that it will enable the operator to efficiently cultivate the soil with a minimum of effort.

While there has been disclosed in this specification one form in which the invention may be embodied, it is to be understood that this form is shown for the purpose of illustration only, and that the invention is not to be limited to the specific disclosure, but may be modified and embodied in various other forms, without departing from its spirit. In short, the invention includes all the modifications and embodiments coming within the scope of the following claims.

Having thus fully described the invention, what is claimed as new, and for which it is desired to secure Letters Patent, is:

1. In a hand cultivator and weeder, a handle and a base thereon, said base having a circular series of flat prongs depending at right angles thereto and integral therewith, the planes of said flat prongs all being tangent to a circle which is concentric with said handle, and of minor size in relation to the base.

2. The invention as defined in claim 1, in which said base comprises a piece of flat sheet metal having four outer edges alternated with inwardly inclined edges, each of said prongs depending from said base between one end of each inclined edge and the adjacent outer edge.

3. In a hand cultivator and weeder, a handle and a flat base thereon, said base comprising a piece of flat sheet metal having four outer edges alternated with inwardly-inclined edges, and a circular series of flat prongs depending from said base between one end of each inclined edge and the adjacent outer edge.

PETER DE CONTI.

REFERENCES CITED

The following references are of record in the file of this patent:

UNITED STATES PATENTS

| Number | Name | Date |
|---|---|---|
| 799,359 | Shaffer | Sept. 12, 1905 |
| 2,082,476 | Allen | June 1, 1937 |

FOREIGN PATENTS

| Number | Country | Date |
|---|---|---|
| 176,834 | Switzerland | July 16, 1935 |